Dec. 3, 1929.                    C. M. JAMIESON                    1,738,431
                           APPARATUS FOR COATING ARTICLES
                           Original Filed Feb. 14, 1922    4 Sheets-Sheet 1

Inventor:
Charles M. Jamieson
by Steward & McKay
his Att'ys

Dec. 3, 1929.                C. M. JAMIESON                1,738,431
                        APPARATUS FOR COATING ARTICLES
                        Original Filed Feb. 14, 1922    4 Sheets-Sheet 3

Inventor:
Charles M. Jamieson
by Steward & McKay
his Att'ys.

Dec. 3, 1929.  C. M. JAMIESON  1,738,431
APPARATUS FOR COATING ARTICLES
Original Filed Feb. 14, 1922  4 Sheets-Sheet 4

Inventor:
Charles M Jamieson
by Stewart & McKa.
his Attys.

Patented Dec. 3, 1929

1,738,431

UNITED STATES PATENT OFFICE

CHARLES MURDOCK JAMIESON, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA

APPARATUS FOR COATING ARTICLES

Application filed February 14, 1922, Serial No. 536,552. Renewed May 4, 1929.

This invention relates to apparatus for coating articles with a thin continuous and smooth coating of any suitable composition or material.

The general object of the invention is the provision of mechanically operating means for applying a fluid, semi-fluid or pasty composition or material to articles and forming therefrom a thin continuous and smooth coating covering the article. The apparatus of the invention is useful in the preparation for market of fresh fruit upon which it is desirable to form a coating from such a composition, to insure the fruit reaching the consumer in sound and salable condition. The apparatus is especially useful for the treatment of oranges, grapefruit, and other citrus fruits which, as is well known, must be handled, packed and shipped with great care if they are to reach the consumer in good condition.

It has been discovered that by properly applying to citrus fruit a mixture of a sealing and waterproofing material, such as paraffin, with a volatile liquid vehicle, such as gasolene, the fruit may be provided with a very thin but continuous coating that protects it from rotting, prevents it from withering, and in general maintains its original appearance, soundness, freshness and flavor for a relatively long time. The apparatus of the present invention enables this treatment to be carried out in a simple, economical and effective manner. Accordingly, in explaining the principles of the invention, reference will be made, for the sake of a concrete illustrative example, to novel apparatus particularly useful in treating citrus fruit on a large scale.

Broadly speaking, the novel apparatus comprises in combination with the composition-applying means, means for brushing or otherwise rubbing substantially the entire surface of the fruit to form a thin continuous and smooth coating from the non-solid composition initially applied thereto. It is highly desirable that the composition be supplied to the fruit in the substantially uniform proper quantity required to form the desired coating without supplying an undue excess. To these ends the means for supplying the composition to the fruit includes traveling carrier means and other means associated therewith for controllably delivering successive fresh supplies of the composition in predeterminable quantities into the path of the advancing fruit.

To obtain a thin coating uniform over the entire surface of the fruit, it is not only essential that the brushing or rubbing action should occur over substantially the entire surface of the fruit, but it is highly advantageous and desirable that the coating composition be initially applied to the fruit over a wide area of its surface as distinguished from a restricted localized initial application or deposit of the composition upon the surface of the fruit. To accomplish this desired object, the novel apparatus also comprises means for so projecting the fruit in an advancing movement across the path of the carrier means that its advancing movement in association with the traveling movement of the carrier means results in relative movements of the fruit and carrier means, thus progressively presenting different areas of the surface of the fruit to contact with the composition.

It is also desirable for accuracy and speed of operation and the required careful handling of the fruit by the apparatus that the fruit, after the coating material has been initially applied thereto, be delivered to the brushing or rubbing mechanism in a predetermined operative position with relation thereto. Accordingly, the novel apparatus includes means for so directing the advancing movement of the fruit across the carrier means that while the coating composition is being applied the fruit is being advanced toward and is finally delivered to a predetermined operative position relative to the brushing or rubbing means. Such directing or guiding means may also advantageously function to aid in changing the rotation axes of the pieces of fruit as they contact with the traveling carrier means, and thereby increasing the area of initial application.

The underlying principles of the invention can be readily understood from the description hereinafter of certain typical embodiments in which said principles are incorporated in forms that not only work satisfactorily but that have the further advantage of utilizing standard fruit handling machinery with only relatively slight alterations to confer upon it the novel capabilities here in question. It is to be understood, however, that the typical embodiments hereinafter described are merely illustrative and that within the broad scope of the invention are included other specific constructions capable of functioning in accordance with the principles here involved.

Such typical embodiments are illustrated in the accompanying drawings, wherein.

In the embodiments of the invention illustrated in the drawings, 10 designates generally a fruit brushing or polishing device or machine of any suitable character, the particular device or mechanism here shown being what is known in the fruit-packing industry as a polisher of the Stebler-Parker type. At 11 is indicated generally a fruit dryer of a type commonly preceding the polisher in the series of machines constituting a usual type of packing house installation.

According to the practice prevailing heretofore where a coating material was not to be applied to the fruit, oranges or other citrus fruit, previously washed in water, and then dried in the dryer, such as is indicated at 11, were passed without further treatment directly to a polisher, such as is indicated generally at 10, from which they were discharged to the usual grading and sizing machinery. At 12 is indicated the usual type of endless conveyor forming a part of the drier and serving to feed fruit to the polisher, and at 13 the usual form of sloping chute board which may serve to continue a forward impelling or feeding movement of the fruit toward the polisher, the chute board imparting a forward rolling movement to the fruit.

In the illustrated apparatus here chosen to make clear the principles of the present invention, means are provided for applying a non-solid coating and preservative material to the fruit so that the brushes or rolls of the polisher can act to spread this coating material over the fruit in a very thin smooth coating as the fruit travels down the runways between the rolls. The coating material applied may be, for example, a suitable mixture of paraffin and gasolene in fluid or semi-fluid form.

In employing the novel apparatus for coating fruit, the coating material may be initially applied to the fruit during its forward feeding movement from the dryer to the polisher, for example. The means for applying the coating material comprises a traveling carrier functioning to convey supplies of the coating material into the path of travel of the fruit in its forward feeding movement referred to. Such carrier or applying means may take many different forms but in the several illustrative embodiments of the invention shown in the drawings, the traveling carrier means comprises an endless belt of canvas, leather or other suitable material adapted to receive a spread thereon of the coating composition, and having a run transversely of the polishing rolls adjacent their receiving ends and in a path of travel such that in the feeding movement of the fruit from the dryer to the polisher the fruit is projected over the surface of the belt and across its path of travel. The belt may be arranged with its transverse run referred to in a horizontal plane, in which case the forward rolling movement initially imparted to the fruit to feed the same to the polisher may be relied on to project the fruit across the carrier belt; or the belt may be arranged at an inclination transversely of its path of travel and downwardly toward the polisher rolls so as itself also to impart a forward rolling movement to the fruit in addition to the movement initially imparted thereto, and in the present illustrative embodiments of the invention the belt is shown so inclined. In either case, there is a rolling movement of the fruit across the surface of the belt in contact with the coating material spread thereon, while at the same time the belt as a carrier imparts a translating movement to the fruit in the direction of its travel which is transverse to the polishing rolls. Were this latter movement of the fruit unrestrained, it is to be observed that in some cases the fruit would be translated beyond operative positions with respect to the polishing rolls. Means are therefore provided to restrain or limit the transverse movement of the fruit induced by the carrier or applying means and to deliver all the fruit from the carrier to operative positions with respect to the polishing rolls, while at the same time so varying the rolling movements of the articles of fruit upon the belt about different axes of each as to progressively present new or additional areas of the article for contact with the coating material. In the present illustrative embodiments of the invention, such limiting means comprise guides extending across the path of travel of the belt and desirably in line with the crowns of the polisher rolls so that the fruit in its combined movements of rolling and translation engages these guides and advances in varied movements of rotation about different axes across the carrier and then enters the runway or runways between the polisher rolls.

The polishing or brushing rolls shown in all the embodiments of the apparatus here illustrated comprise a plurality of parallel rolls 14 with spirally cut brush surfaces and arranged in a series horizontal transversely and inclined longitudinally downwardly from their upper or receiving ends to their lower or delivery ends, all so as to feed the fruit from the receiving to the delivery end during the brushing action, the fruit advancing in the runways formed between pairs of adjacent rolls and contacting with the brush surfaces of each during the brushing or polishing operation. The gears for rotating the brush rolls are shown at 15. The brushes of the polisher rolls are commonly of horse-hair bristles. The brush rolls need be arranged at but a slight inclination but in the drawings of the illustrative forms of the apparatus the angle of inclination of the brush rolls is exaggerated for the sake of clearness of illustration.

The brush rolls 14 are mounted in a frame 16 having side boards 17 obliquely inclined from the frame to a line closely adjacent the cylindrical surfaces of the two outside rolls and along their entire lengths.

Figure 1:
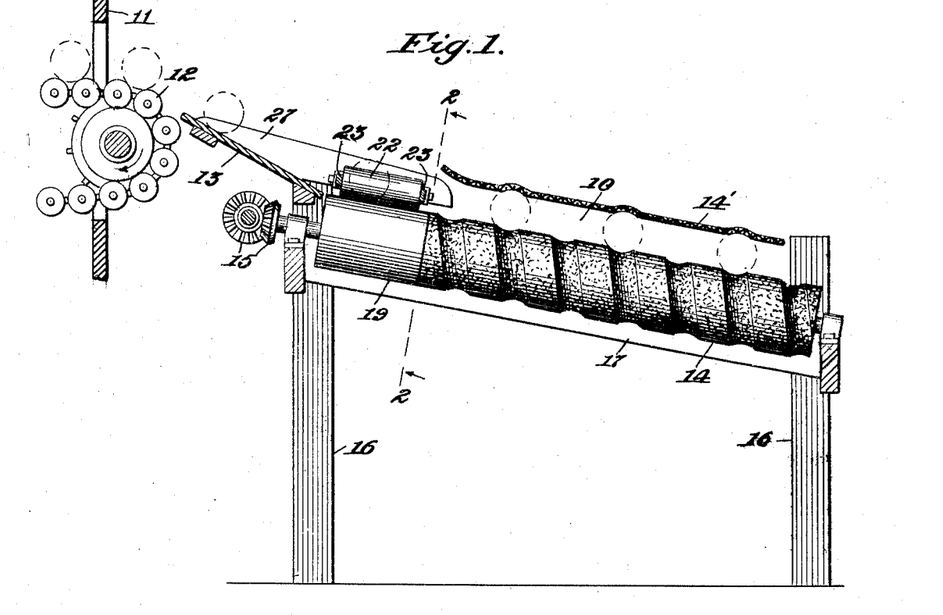
Fig. 1 is a side elevation, partly broken away and in section, of an especially desirable practical embodiment of the novel apparatus.
Figure 2:
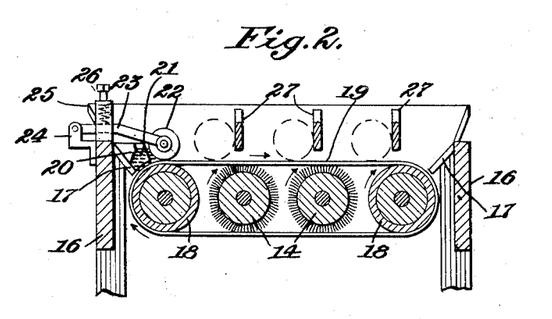
Fig. 2 is a perpendicular transverse section thereof along the line 2—2 of Fig. 1, looking in the direction of the arrows.

In the embodiment of the novel apparatus illustrated in Figs. 1 and 2 the upper or receiving end portions of the two outside rolls of the series are replaced by or formed into pulleys 18, which may be done either by removing the brushes of these rolls for the required distance rearwardly of their receiving ends and by securing in place thereof metallic or other suitable bands forming pulleys or by shortening the rolls and securing pulleys on the axles of these rolls, the former being the form of pulley adopted in the embodiment referred to, as shown in Fig. 2.

Over the pulleys 18 is trained an endless belt 19 of canvas, leather or other material adapted to receive a spread of a semi-fluid or pasty coating material, the belt 19 extending transversely across the receiving end portion of the rolls as shown in Fig. 2, in a path horizontal in the direction of travel of the belt and inclined transversely of that path of travel at the angle of inclination of the brush rolls.

With the arrangement described, the upper surface of the belt has one edge closely adjacent the chute board 13 to receive therefrom the fruit in the forward rolling movement imparted thereto by said chute board.

A supply container for the composition which may be semi-fluid or pasty in consistency, is provided in this particular instance by that portion of the side board 17 closely adjacent the pulley 18 and belt thereon on one of the outside rolls, the one shown at the left in Fig. 2, and by side plates 20, one of which is indicated in Fig. 2, the side plates 20 being spaced apart to form the container of substantially the width of the belt 19, which belt constitutes another and curved side or floor of the container, so that the semi-fluid or pasty material 21 deposited in the container is always maintained by gravity in contact with that portion of the belt passing thereacross. A presser roll 22, engaging the belt 19 upon the upper or retreating run of the belt from the container is mounted in a pair of lever arms 23, pivoted upon a pair of brackets 24 extending from the side frame 16. Springs 25 whose tensions are adjustable at will by the spring followers 26, bear upon the lever arms 23, and constitute means for adjusting the contacting pressure of the roller 22 upon the belt. By the arrangement of parts described, it is obvious that semi-fluid or pasty material placed in the container will adhere to the belt 19 travelling thereacross and that the quantities remaining upon the belt in its upper run will be determined by the contacting pressure of the roll 22, the quantities pressed off by the roll dropping back into the container.

A plurality of guide plates 27, corresponding in number less one to the brush rolls are secured to the upper surface of the chute board 13 and extend from near the upper end of that runway across the belt 19 and projecting a short distance beyond the belt and over the crowns of the brush rolls approximately in line with the axes thereof. As shown in Fig. 2, a guide plate for each of the rolls of the series save the first, counting in the direction of travel of the upper run of the belt, extends across the belt, as stated. The roll 22 is relied upon to act as the first guide of the series, and if desired an additional guide plate may extend along the chute board 13 to the nearest end of the roll 22, or the chute board 13 and the upper run of the belt 19 may be of such relative extents, measured transversely of the apparatus, that the side of the chute adjacent the roll 22 may be relied upon to guide the fruit to clear the end of roll 22.

By the arrangement of parts described and shown in Figs. 1 and 2, it is apparent that the articles of fruit delivered from the dryer 11 will roll down the chute board 13 in separate groups spread over the surface of the runway between the guide plates 27 and in like fashion upon and across the belt 19. The fruit thus delivered upon the belt 19 will continue its forward rolling movement toward the polisher rolls, which forward rolling movement will be transversely of the path of movement of the belt and over its surface in contact with the semi-fluid or pasty coating material thereon. At the same time a transverse translating movement is imparted to the fruit in the direction of travel of the belt, which movement brings the articles of fruit separately into contact with the guide plates 27 or into contact one with another by the restraining action of the guide plates, which contacts change the initial directions of the rolling movements of the fruit upon the belt and repeatedly vary the directions or axes of rotation of the subsequent rolling movements, resulting in different areas of the surface of the fruit being progressively presented to contact with the coating material upon the belt, until by the time the articles of fruit have rolled across the surface of the belt, a major portion of the surface of each, if not substantially the entire surface, has an adhering coating of the semi-fluid or pasty composition. It is further to be observed that by reason of the guide plates the articles of fruit are delivered from the belt directly into the elongated runways between adjacent brush rolls, which are the operative positions for that rubbing and brushing action which uniformly distributes the adhering coating material over the surfaces of the fruit and forms therefrom a thin, uniform, smooth and adherent coating that effectively preserves the fruit in fresh and sound condition.

To aid in turning the articles or pieces of fruit over and over in all directions as they traverse the elongated runways between adjacent brush rolls and thus assist in obtaining thorough and uniform distribution of the coating material thereover, means may advantageously be provided arranged to yieldingly engage the upper surfaces of the pieces of fruit frictionally as they travel along the brush rolls, and in the illustrative embodiment of the apparatus shown in Fig. 1, such means is provided in the form of a blanket 14' of any suitable material, such for example as a woven fabric, which is secured along the side edges of the frame 16 to extend over the brush rolls.

Figure 3:
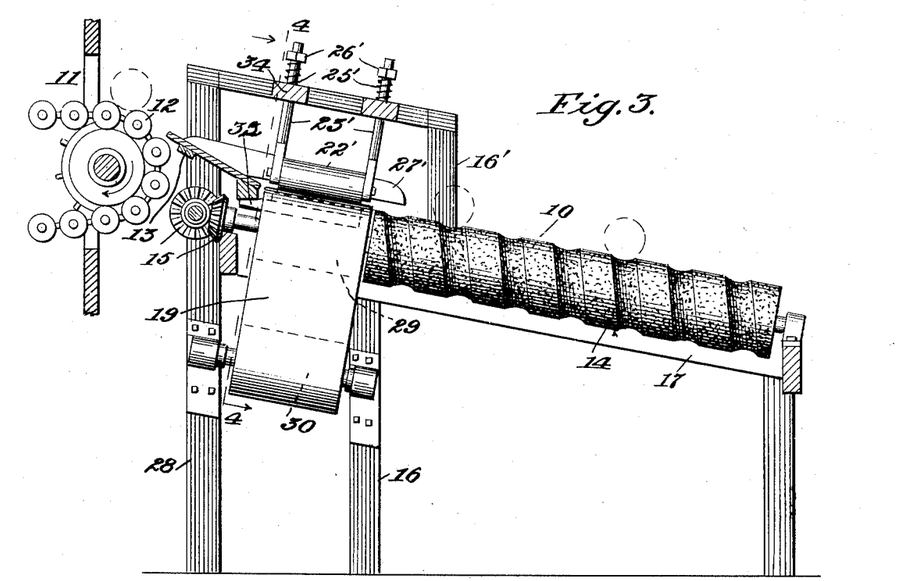
Fig. 3 is a side elevation, partly broken away and in section, of another form the apparatus may take.
Figure 4:
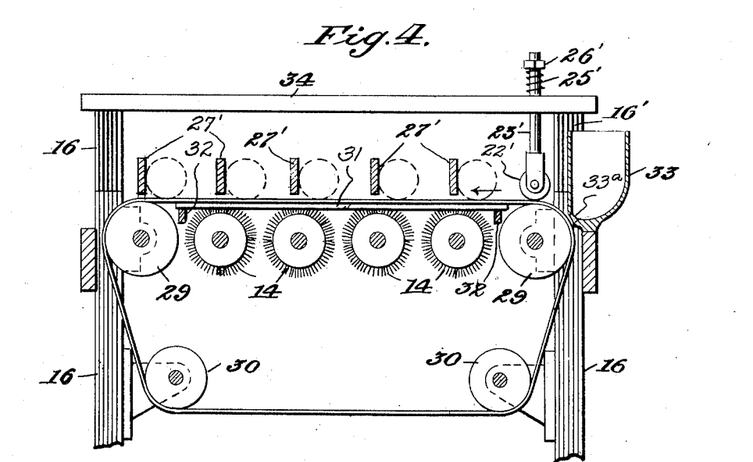
Fig. 4 is a perpendicular transverse section thereof along the line 4—4 of Fig. 3, looking in the direction of the arrows.

In the form of the apparatus illustrated in Figs. 3 and 4, an additional frame work 28 is provided to accommodate the belt carrier device in advance of the receiving ends of the brush rolls 14. As before stated, the belt carrier device may be a self-contained mechanism independently driven and entirely separate structurally from the brusher or polisher and from the other apparatus such as the dryer and feeding runways constituting the apparatus series of the customary packing-house installation, said device may be assembled in series with and between the dryer and the polisher to perform the function of supplying coating material to the fruit on its way to the brusher or polisher. But in the illustrative embodiment of the apparatus now referred to in connection with Figs. 3 and 4, use is made of a portion of the framework of the brusher and polisher and of its driving mechanism in supporting and driving the composition carrier or applying device. Standards 16' are extended upwardly from the frame of the polisher unit as shown in Figs. 3 and 4 to cooperate with the standards 28 to provide supporting mountings for the various parts of the carrier device. The brush rolls are not modified to provide for belt pulleys as in the first described embodiment, but their axles are extended forwardly through suitable journal mountings in the frames 16 and 28, disposing the driving gears 15 in the frame-work 28; and upon the extended portions of the axles of the two outer brush rolls are secured the driving pulleys for the belt carrier, two such pulleys being shown at 29 in Fig. 4. Idler rolls or pulleys 30 are mounted below on axles journaled in the frames 16 and 28 as shown in Figs. 3 and 4, and the belt 19 is trained over these pulleys so that the belt in its travel presents an upper run horizontal in the direction of its movement and inclined transversely of its path at the angle of inclination of the brush rolls.

The chute board 13, heretofore referred to, is desirably supported in the extended framework 16—28 and this runway may be disposed at the proper inclination to extend immediately beneath the upper runway of the belt 19 so as to provide a firm supporting surface for that the belt in its upper path of travel, or, as shown in the illustrative apparatus, a separate supporting surface in the form of a board or plate 31, suitably mounted, for example by brackets 32 as shown in Figs. 3 and 4, may be employed.

A container 33 for the semi-fluid or pasty coating material, having a slot-like outlet 33ª in its bottom is suitably mounted upon the framework of the carrier device, for example as shown in Fig. 4, to position said outlet in close juxtaposition to the belt 19 in its travel over the pulley 29 shown at the right in Fig. 4.

A presser roll 22' is journaled in the lower end portions of arms 23' loosely extending through supports 34 mounted on the upper portions of the frames 16—28, the arms 23' being spring pressed longitudinally toward the belt 19 by springs 25', whose tensions are adjustable at will by spring followers in the form of nuts 26'. The presser roll 22' and its operating parts function as do the corresponding parts in the form of the apparatus illustrated in Figs. 1 and 2 to predetermine and vary at will the quantity of the coating material remaining on the upper run of the belt 19.

Guide plates 27' are secured to the chute board 13 and extend across the carrier belt and over the crowns of the brush rolls, their arrangement and function being substantially identical with the corresponding parts heretofore referred to in the description of the form of the apparatus shown in Figs. 1 and 2.

Figure 5:
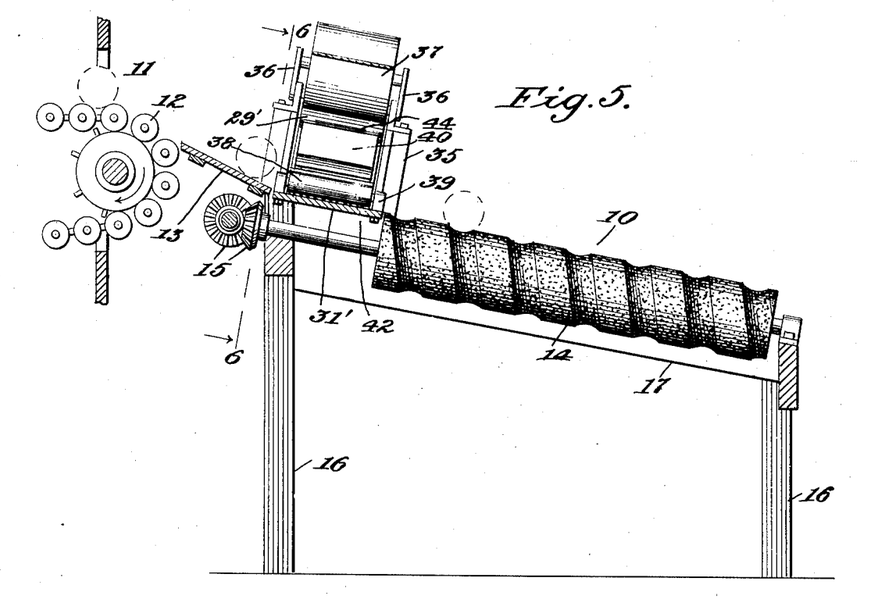
Fig. 5 is a side elevation, partly broken away and in section, of still another form the apparatus may take.
Figure 6:
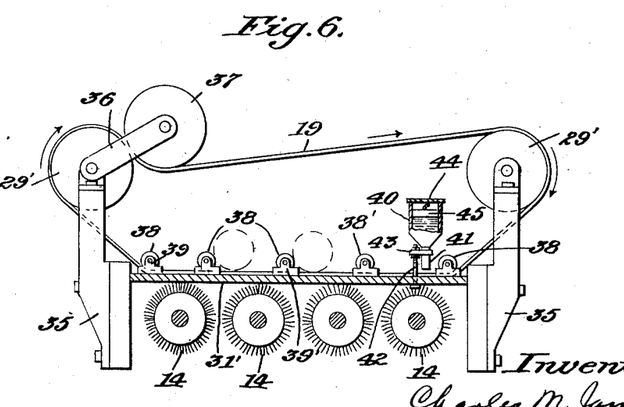
Fig. 6 is a perpendicular transverse section along the line 6—6 of Fig. 5 looking in the direction of the arrows.

Figs. 5 and 6 show still another form which the apparatus may take. In this form, also, the frame of the brusher and polisher is for convenience and compactness utilized to position the carrier device. The brush rolls may either be shortened upon their axles or the frame and axles extended to provide supporting and driving parts for the carrier device. Fig. 5 is intended to illustrate an extension of frame 16 and of the axles of the brush rolls beyond the upper or receiving ends of those rolls to provide for the location of the carrier device with its belt closely adjacent said receiving ends.

A board or plate 31' is extended across the frame 16 over the extension of the axles of the brush rolls, transversely of the rolls and inclined therewith to provide a support for the material-supplying run of the belt thereover and for other mechanisms cooperating with the belt, as will later appear. Two pairs of brackets 35 having arms extending upwardly of the supporting plate 31' are secured in each of the side frames 16 to provide supports for and to position the driving mechanism of the carrier belt above the supporting plate. Pulleys 29' are mounted in the brackets, one for each pair, upon axles journaled in the upwardly extending arms, and over which pulleys the belt is trained. The driving power for the belt may be applied to either pulley in an obvious manner, for example, by a driving pulley upon the axle of either pulley or by suitable gearing. A pair of lever arms 36 is pivotally supported from the axles or journal arms of one of the pulleys 29', as shown at the left in Fig. 6, and in which lever arms an idler roll or pulley 37 of sufficient weight is journaled to exert a gravity pressure upon the belt intermediate the two pulleys 29' to maintain the belt in the proper taut condition to run smoothly over the supporting plate 31'. The belt is restrained to run without substantial friction in a path longitudinally of and over the surface of the supporting plate 31' by idler rollers 38, one at each extremity of the upper run of the belt, extending transversely of the run of the belt upon the plate 31', and journaled in brackets 39 secured to the plate 31' beyond the opposite edges of the belt, the belt being arranged to travel beneath the rollers. Intermediate the idler rollers 38 are spaced rollers 38', mounted on brackets 39' upon the plate 31' beyond the opposite edges of the belt, to extend over and transversely across the upper run of the belt. The rollers 38', like the guide plates 27 heretofore referred to in connection with other illustrative embodiments of the apparatus, vary the directions of rotation of the fruit in its rolling movements across the belt so as to present additional areas to contact with the coating material, and to prevent the fruit from being largely carried to the far side of the apparatus and to properly guide it in its rolling movement to the runways between adjacent polisher rolls. Accordingly, the rollers 38' are most desirably positioned, as were the guide plates in the heretofore described embodiments of the apparatus, substantially in line with the crowns of the brush rolls.

A container 40 for the fluent coating material is positioned immediately above the run of the belt upon the plate 31', and has a downwardly extending spout 41 with a narrow discharge opening elongated transversely of the belt to discharge the coating material downwardly upon substantially the entire width of the belt. The container is supported above the run of the belt referred to with its spout and discharge opening toward and in close proximity to the surface of the belt by bolts 42 extending through the supporting plate 31' clear of the belt, and through a bracket 43 secured to the neck or spout of the container, nuts upon the bolt serving to rigidly clamp the bracket in supported position, as shown in Fig. 6.

The container is provided with a removable cover 44 for the insertion of the coating material and a weight 45 is advantageously used to assist in the downward movement and delivery of the material, especially when the material used is of a fairly thick consistency.

Figure 7:
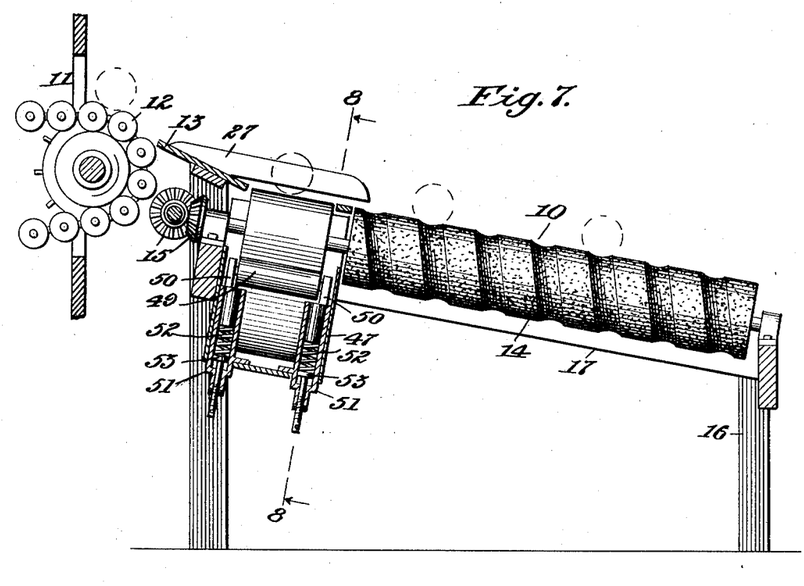
Fig. 7 is a side elevation, partly broken away and in section, of a fourth form the apparatus may take.
Figure 8:
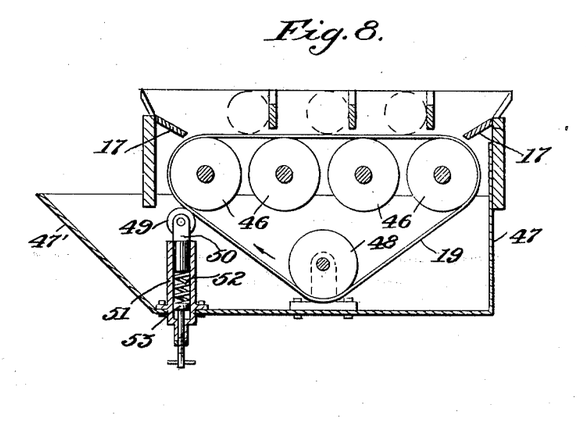
Fig. 8 is a perpendicular transverse section thereof along the line 8—8 of Fig. 7, looking in the direction of the arrows.

In the form of the apparatus illustrated in Figs. 7 and 8, the carrier device is positioned with respect to the polisher substantially as in that form illustrated in Figs. 3 and 4. The frame 16 of the polisher and brusher is extended so as to provide for that extension of the axles of the brush rolls, toward the dryer, as shown in Fig. 7, permitting the mounting thereon of the belt pulleys. In the form of the apparatus shown in Figs. 7 and 8, as many belt pulleys are used as there are brush rolls, one upon the extended axle of each roll, four, indicated by the numeral 46, being shown in Fig. 8, the additional pulleys intermediate the two outer of the series serving to provide intermediate supporting surfaces for the belt which obviates the necessity of a supporting plate.

The container for the coating material in this form of the apparatus is a tank 47, which offers certain advantages over the form of containers heretofore referred to, especially where the coating material is thinly fluid.

The tank 47 is suitably supported in depending position from parts of the frame 16, as shown, and an outwardly extending funnel portion 47' serves as a convenient means of delivering the coating material to the container.

To supply the coating material to the belt, the belt is trained downwardly under a roller 48 journaled in brackets extending from the floor of the container. The belt is traveling through the fluent material in the container obviously receives by adherence thereto supplies of the material; and to predetermine the quantity carried into the path of the fruit a presser roll 49 is provided mounted above the liquid level of the material in the container, journaled in arms 50 mounted for longitudinal movement in spring boxes 51 containing springs 52 bearing upwardly against the arms 50, the tensions of which springs are adjustable at will by spring followers 53.

The blanket 14' shown overlying the polisher rolls in that form of the apparatus illustrated in Figs. 1 and 2 may also be used to advantage with the brush rolls of the other embodiments described in the remaining figures of the drawings, but for convenience is not illustrated therein.

What I claim is:

1. Coating apparatus comprising the combination, with carrier means for coating material and for supporting articles to be coated, said carrier means being movable in a predetermined path, means for supplying coating material to said carrier means, and driving means for said carrier means, of means arranged to project articles to be coated into the path of travel of said carrier means and in contact with coating material thereon, and means arranged to receive from said carrier means articles so projected and to distribute adhering coating material thereover.

2. Coating apparatus comprising the combination, with a traveling carrier device for coating material and for supporting articles to be coated in contact with said material, means for supplying coating material to said carrier device and actuating means therefor, of means for delivering articles to said carrier device for application of said coating material, and means arranged to receive articles from said carrier device and operative to distribute thereover coating material applied thereto by said carrier.

3. Coating apparatus comprising the combination, with a carrier device movable in a predetermined path, means for controllably supplying coating material in predeterminable quantities to said carrier device, and driving means for said carrier device, of means arranged to project articles to be coated across the path of travel of said carrier device and in contact with coating material thereon, and means arranged to receive from said carrier device articles so projected and to distribute adhering coating material thereover.

4. Apparatus for coating fruit or like articles comprising the combination, with a traveling carrier device, and means for supplying coating material thereto, of means for delivering the articles to be coated to said carrier device for application of said coating material thereto, said carrier device being arranged to impart a rolling movement to said articles in contact with said coating material upon said carrier device, and means arranged to receive articles from said carrier device and operative to distribute thereover coating material applied thereto by said carrier.

5. Apparatus for coating fruit or like articles comprising the combination, with a traveling carrier device, means for supplying coating material thereto, of means for delivering the articles to be coated to said carrier device for application of said coating material thereto, said carrier device being arranged to impart a rolling movement to said articles in contact with said coating material upon said carrier device, and means adapted to be engaged by said articles in their movement upon said carrier device to vary the direction of rolling movement imparted to said articles by said carrier device, and means arranged to receive articles from said carrier device and operative to distribute thereover coating material applied thereto by said carrier device.

6. In an apparatus for coating fruit or like articles, the combination of a traveling conveyor belt adapted to transport the articles in the direction of travel of the belt and arranged at an inclination, to cause rolling movement of the articles over the surface of the belt, and means for spreading a coating material upon said belt.

7. Apparatus for treating fruit comprising in combination, revoluble rubbing or brushing roll mechanism and means actuated by said roll mechanism for initially applying a coating composition to the fruit.

8. Apparatus for treating fruit comprising in combination, parallel inclined revoluble rubbing or brushing rolls cooperating to provide a runway for the fruit between each two adjacent rolls, driving means for said rolls, and driven means arranged to apply a coating composition to fruit entering the upper end of each said runway.

9. An apparatus for coating fruit or like articles comprising in combination, brushing or polishing means having a plurality of parallel brush rolls cooperating in pairs to provide runway means, an endless traveling carrier belt arranged adjacent the receiving ends of said brush rolls and traveling transversely of said rolls, said belt being disposed to receive and support said articles upon its upper surface in the advance of said articles to said brushing or polishing means, means for supplying a coating material to the upper surface of said belt, means for delivering articles to be coated upon said surface and guides extending transversely of said surface and adapted to direct said articles across said surface to positions between adjacent brush rolls.

10. Apparatus for coating fruit or like articles comprising in combination, brushing or polishing means including a plurality of parallel brush rolls cooperating in pairs to provide inclined runways, a pulley upon the upper end of each of the two outer rolls of said plurality, and an endless belt trained over said pulleys and across said rolls, means for rotating said rolls and said pulleys, means for supplying a coating material to said belt, and means for directing articles to be coated across said belt and into said runways.

11. Apparatus for coating fruit or like articles comprising in combination, brushing or polishing means having a series of parallel brush rolls, a pulley upon each of the adjacent ends of the two outer rolls of the series, and an endless belt trained over said pulleys and across said rolls, means for rotating said rolls and said pulleys, means for supplying a material to the outer surface of said belt, means for causing movement of the articles to be coated across said belt and in the direction of said brush rolls, and guides extending across said belt and directing said articles to positions of initial contact with said brush rolls between two adjacent rolls.

12. Apparatus for applying coating-material to fruit comprising the combination, with brush-rolls and driving mechanism therefor, of a container for coating material and coating-material feeding means operated synchronously with the brush rolls and adapted to remove coating material from said container at a rate in substantially constant proportion to the speed of rotation of said brush rolls and to apply said material directly to the fruit to be coated.

13. Apparatus for applying coating-material to fruit comprising the combination, with coating-material distributing means and driving mechanism therefor, of a container for coating material and coating-material feeding means operated synchronously with the coating-material distributing means and adapted to remove coating material from said container at a rate in substantially constant proportion to the speed of said driving mechanism and to apply said material directly to the fruit to be coated.

14. Apparatus for applying coating-material to fruit comprising the combination, with brush-rolls and driving mechanism therefor, of a container for coating material and coating-material feeding means operated from said driving mechanism and adapted to remove coating material from said container at a rate in substantially constant proportion to the speed of rotation of said brush rolls and to apply said material to the fruit to be coated prior to contact of said fruit with said brush-rolls.

15. Apparatus for applying coating-material to fruit comprising a traveling belt device arranged to freely support the fruit unrestrained from rolling movement, means for feeding fruit onto said belt device, means for supplying coating material to said belt device for contact of said fruit with said coating material, and rubbing or brushing members cooperating to form a runway for the fruit and arranged to receive fruit from said belt device.

16. Apparatus for coating fruit comprising the combination, with rubbing or brushing members cooperating to provide a fruit runway, means for driving said members, and a container for coating material, of driven means arranged to remove coating material from said container at a rate proportional to the rate at which said members are driven and to apply coating material directly to fruit fed into said runway.

17. Apparatus for coating fruit comprising the combination, with parallel revoluble rubbing or brushing rolls cooperating to provide a fruit runway, means for driving said rolls, and a container for coating material of driven means arranged to remove coating material from said container at a rate proportional to the rate at which said rolls are driven and to apply coating material to fruit fed into said runway.

18. Apparatus for coating fruit comprising the combination, with a traveling carrier belt and means for supplying a coating material thereto, of means for delivering fruit upon said carrier belt to receive therefrom an application of such coating material, means arranged to impart a rolling movement to fruit while on said belt, and a pair of parallel rotary brush rolls cooperating to provide a fruit-rubbing runway into which fruit passes from said carrier belt.

19. Apparatus for coating fruit comprising the combination, with a fruit dryer, a traveling carrier belt arranged to receive and to impart rolling movement to fruit delivered from said dryer, and means for supplying a coating material to said belt for application to fruit to be coated, of means arranged to receive fruit from said carrier belt and operative to distribute thereover coating material applied thereto by said carrier belt.

In testimony whereof I hereunto affix my signature.

CHARLES MURDOCK JAMIESON.